United States Patent [19]

Wu

[11] Patent Number: 4,538,730
[45] Date of Patent: Sep. 3, 1985

[54] COLLAPSIBLE STORAGE BOX FOR FLOPPY DISK

[76] Inventor: Chyi-Ying Wu, P.O. Box 10160, Taipei, Taiwan

[21] Appl. No.: 611,885

[22] Filed: May 18, 1984

[51] Int. Cl.³ .............................................. B65D 85/30
[52] U.S. Cl. ...................................... 206/444; 206/1.5; 206/44 B; 206/309; 206/425; 292/163; 312/13
[58] Field of Search ................ 206/1.5, 309, 310, 311, 206/312, 313, 44 B, 425, 444, 445; 292/57, 60, 62, 163, 169, 169.14, 169.17, 169.19, DIG. 37; 220/335; 312/9–14

[56] References Cited

U.S. PATENT DOCUMENTS

| | | | |
|---|---|---|---|
| 533,053 | 1/1895 | Cooke, Jr. | 206/425 |
| 612,572 | 10/1898 | Robertson | 206/1.5 |
| 1,709,182 | 4/1929 | McKnight | 220/335 |
| 2,261,806 | 11/1941 | Hills | 312/10 |
| 2,323,245 | 6/1943 | Schenker | 206/311 |
| 3,027,005 | 3/1962 | Finnerty | 206/311 |
| 3,659,703 | 5/1972 | Oliver | 206/425 |
| 3,893,721 | 7/1975 | Upton | 292/DIG. 37 |

FOREIGN PATENT DOCUMENTS

| | | | |
|---|---|---|---|
| 2149690 | 4/1973 | Fed. Rep. of Germany | 206/311 |
| 582670 | 9/1958 | Italy | 206/311 |
| 132812 | 4/1929 | Switzerland | 206/311 |
| 415607 | 8/1934 | United Kingdom | 206/309 |

*Primary Examiner*—George E. Lowrance
*Assistant Examiner*—Jimmy G. Foster

[57] ABSTRACT

A collapsible storage box for floppy disk includes a casing, a switch means and a collapsible storing means consisting of a plurality of storage bags for storing floppy disk for computor use whereby the collapsible bags can be extended to form a sector type for easy and convenient take-out or take-in service for the floppy disks.

2 Claims, 6 Drawing Figures

COLLAPSIBLE STORAGE BOX FOR FLOPPY DISK

BACKGROUND OF THE INVENTION

Conventional case for storing floppy disk for computor use is designed to put all disks together into the case in a way like a card-index system used in a library. However, such a conventional case has the following defects:

1. The disks are crowded or overlapped within the case whereby the insertion or withdrawal of a disk among the piles of disks is inconvenient and will take time. The abrasion caused between the contacting surfaces of the disks will deteriorate the disks and influence the precision of the disks.
2. The discription label adhered on the disk which is vertically standing and put into disk case can be read when stored in disk case. However, when the disk is put into disk drive for computer operation, the words description on disk will become reversed to the reader or operator and thus increase inconvenience for the user.
3. A conventional disk case is made from plastic material. The disk stored in the plastic case will be interfered in a surrounding having magnetic flux to reduce the precision of the disk.

The present inventor has found the defects of conventional disk case and invented the present collapsible storage box for floppy disk.

SUMMARY OF THE INVENTION

The object of the present invention is to provide a collapsible storage box for floppy disk including a casing, a switch means and a plurality of collapsible storage bags retractably formed in the casing, whereby the switch means is actuated to open a cover of the casing and the storage bags will be automatically extended for taking a disk out from the bag in a more convenient way without abrasing the disk.

DETAILED DESCRIPTION

Figure 1:
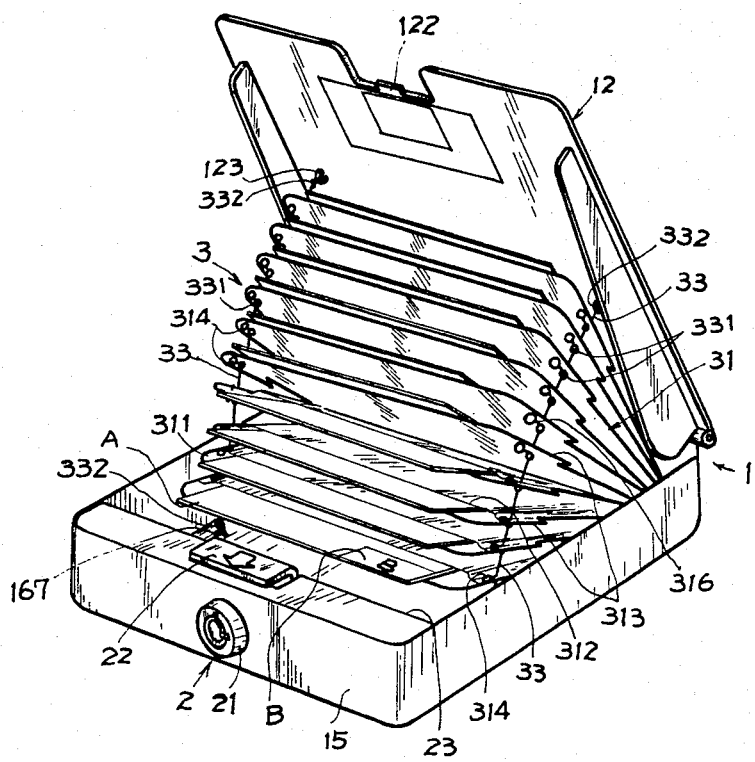
FIG. 1 is a perspective drawing of the present invention.

As shown in the figures, the present invention comprises a casing 1 having an upper cover 12 and a bottom case 11, a switch means 2 and a collapsible storing means 3.

The upper cover 12 is pivotely mounted on the rear wall plate 111 of bottom case 11 by a hinge which comprises several hinge holes 112, 121 and several restored springs 14 jacketed in pin 13 to restore upper cover 12 in an opening tendency. An extension lip 122 is formed on the front edge of upper cover 12.

Figure 2:
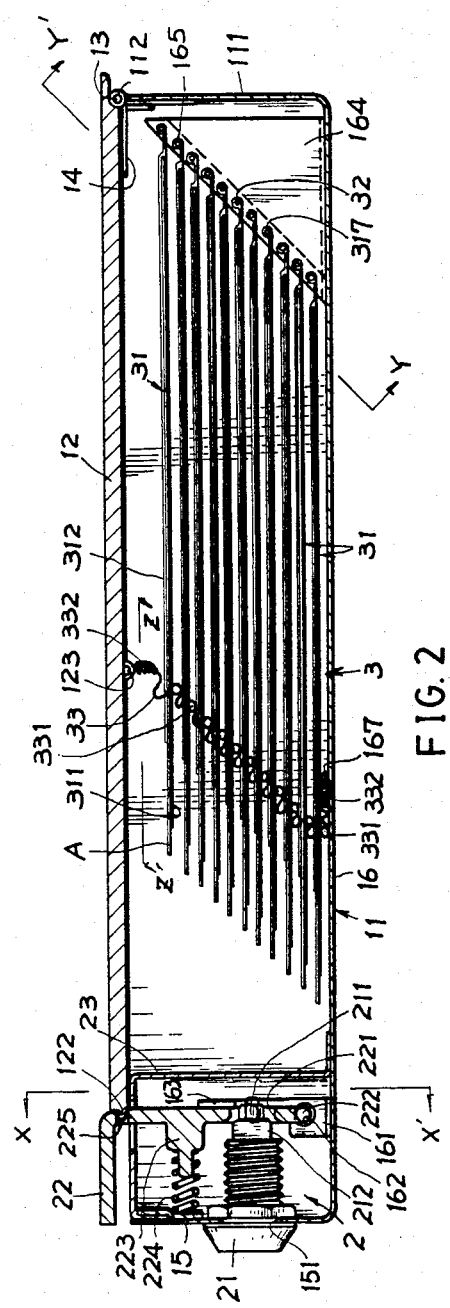
FIG. 2 is a side-view sectional drawing of the present invention.
Figure 3:
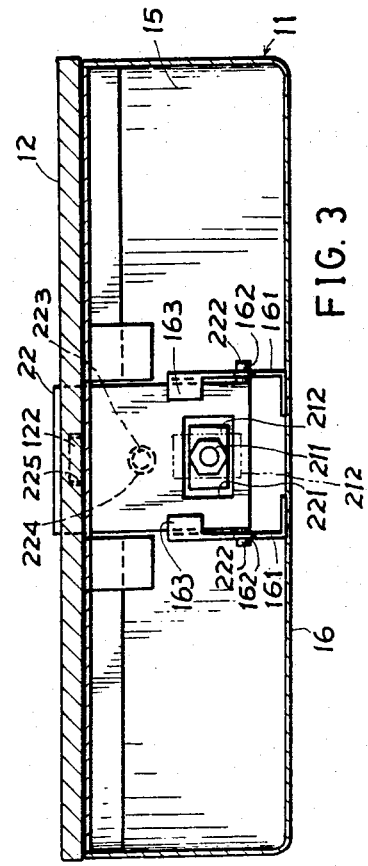
FIG. 3 is a side-view drawing taken from X—X' direction of FIG. 2.
Figure 4:
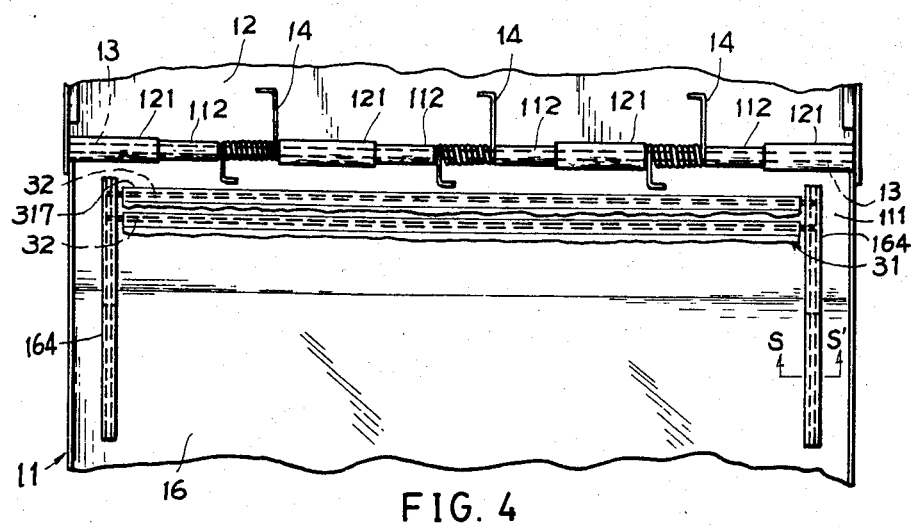
FIG. 4 is a side-view drawing taken from Y—Y' direction of FIG. 2.
Figure 5:
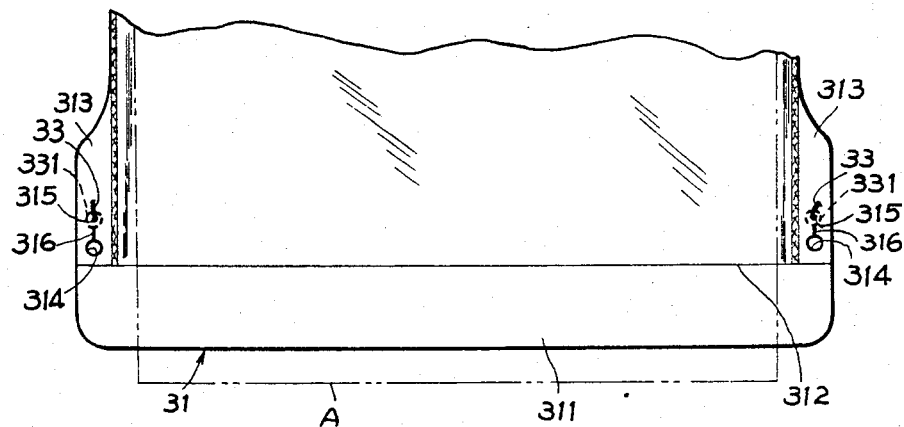
FIG. 5 is side-view drawing taken from Z—Z' direction of FIG. 2.
Figure 6:
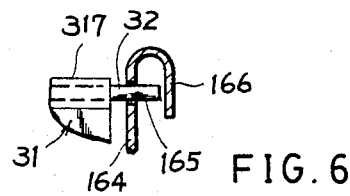
FIG. 6 is a side-view sectional drawing taken from S—S' direction of FIG. 4.

A lock 21 of switch means 2 is fixed on a hole 151 formed on the front wall plate 15 of case 11. A rectangular locking latch 212 is fixed on the inner portion of lock 21 by a nut 211 to normally face a corresponding rectangular hole 221 which is formed on the lower portion of push-button 22 to allow the normal depressing action of push-button 22. Push-button 22 is lowerly formed with two side pins 222 pivotely fixed on two holes 162 of two brackets 161 fixed on the portion of bottom plate 16. Two extension plates 163 are formed on brackets 161 to define the backward motion of push-button 22. Push-button 22 is formed with an extension bar 223 which is jacketed with a compression spring 224 resiliently backing against the inside wall of wall plate 15. The upper portion of push-button 22 is formed with a lip hole 225 to engage with the extension lip 122 of cover 12 for closing upper cover 12 on bottom case 11. A partition plate 23 is formed to enclose the lock 21 within a compartment disposed by bottom plate 16, front wall plate 15 and plate 23 within said bottom case 11 but to project push-button 22 outwards as FIG. 2 shown.

A collapsible storing means 3 consists of a plurality of collapsible storage bags 31 each being formed by binding an upper transparent film 312 with a lower base plate 311 to store the floppy disk A for computor use. Each bag 31 is formed with two side wing portions 313, each being formed with a big hole 314 and a small hole 315 and a slit 316 being cut to communicate with hole 314 with hole 315. Two wires 33 tensioned by two tension springs 332 respectively are connected to two lugs 123, 167 formed on upper plate 12 and bottom plate 16. Each wire 33 is formed with a plurality of balls 331 each divided in equal distance. Wire 33 fixed with balls 331 is passing through the big holes 314 formed on the wing portions 313 and then wire 33 is moved from each slit 316 to pass through the small holes 315 to allow each ball 331 slidingly backing each bag 31 to extend all the bags 31, as a sector shape as taken from side view therefrom, when opening the upper cover 12 and pulling the wire 33.

The inner end of each bag 31 is terminated with a rolled portion 317 and a pin 32 which is pivotely fixed in two pin holes 165 respectively formed on two triangle supporting plates 164 disposed on both sides of bottom plate 16. The pin holes 165 are slopingly formed on the slope side of triangle supporting plate 164 so as to form sector-type collapsible bags when extended. The number of holes 165 is the same as the number of bags 31. Each plate 164 is bent outwards to form a hook 166 to define each pin 32 and prevent its falling from the supporting plate 164.

The bottom case 11 is made from metals having magnetic absorbing property, to absorb magnetic flux so as to prevent from magnetic interference to the floppy disks A stored in the casing 1.

When opening the present invention, the push-button 22 is depressed to open upper cover 12 as restored by springs 14, the wire 33 with balls 331 will be pulled to extend all storage bags 31 to form a sector shape so that each disk A is easily taken out from each bag. When not in use, the cover 12 is closed and the lock 21 is actuated to rotate latch 212 in 90 degrees so as to obstruct the rectangular hole 221 of push button 22 whereby the button 22 can not be depressed. When retracting all bags within the casing 1, each ball 331 formed on wire 33 will separate every two neighbouring bags 31 to prevent the overlapping, abrasion between the bags.

The present invention has the following advantages superior to conventional disk cases:

1. The storage bags 31 can be opened as a sector type and the disks stored therein will be easily taken out or taken in without damaging the disks.

2. When retracting all bags within the casing, each bag is separated from another bag so as to eliminate the abrasion of disks during storage or handling.

3. The description label can be directly adhered on disk as "B" shown in FIG. 1 which will also be easily read when put into a disk drive due to the same reading direction.

4. The present invention has property to prevent from interference by magnetic flux so as to ensure the reliability and precision of the disk.

5. The present invention can be easily and fastly closed after opening the cover so as to have a dust-proof property. In closing state the disks originally stored in the bags will not be exposed to the outside surrounding to have a sound dust-proof effect.

However, the conventional disk case is difficult to open or close and whenever taking out the disk from the open case, the disk will be easily contaminated by air or environmental pollutants.

I claim:

1. A collapsible storage box for floppy disk comprising:

a casing having an upper cover and a bottom case, said upper cover pivotedly mounted on a rear wall plate of said bottom case by a hinge and normally restored to an opening position by a plurality of restored springs jacketed on a pin of said hinge;

a switch means including a lock fixed on a front wall plate of said bottom case, a push-button lowerly formed with two side pins pivotedly fixed on two brackets formed on the front portion of a bottom plate of said bottom case, and a partition plate defining said lock within a compartment among said front wall plate, said bottom plate and said partition plate within said bottom case to project said push-button outwards, said push-button formed with a lip hole on its upper portion which is engaged with an extension lip formed on a front edge of said upper cover when closing said upper cover on said bottom case; and a collapsible storing means including a plurality of collapsible strorage bags each formed by binding an upper transparent film with a lower base plate for storing a floppy disk therein, each said bag being terminated with a pin which is pivotedly fixed in two pin holes respectively formed on two triangle supporting plates disposed on both sides of said bottom plate, a plurality of said pin holes being slopingly formed on the slope side of said triangle supporting plate, each said bag formed with two side-wing portions on its both sides and each side-wing portion formed with a big hole and a small hole communicated with said big hole by a slit cut therebetween, two wires each tensioned by two tension springs respectively connected to said upper cover and said bottom plate and each wire formed with a plurality of balls each divided in an equal distance, said wire fixed with said balls passing through said big holes formed on said side-wing portions and said wire then moved from each said slit to pass through said small hole to allow each said ball slidingly backing each said bag to extend all said bags as a sector shape for easier withdrawal or storing of floppy disk when opening said upper cover and pulling said wires.

2. A collapsible storage box according to claim 1, wherein said lock of said switch means is formed with a rectangular locking latch to normally face a corresponding rectangular hole formed on the lower portion of said push-button to allow normal depression action of said push-button and said lock can be actuated to rotate said latch in 90 degrees to obstruct said push-button from its depression so as to lock said upper cover on said button case, said push-button being formed with an extension bar jacketed with a restored spring backing against inside wall of said front wall plate so that said push-button is always ready for depression action when opening said upper cover.

* * * * *